United States Patent Office.

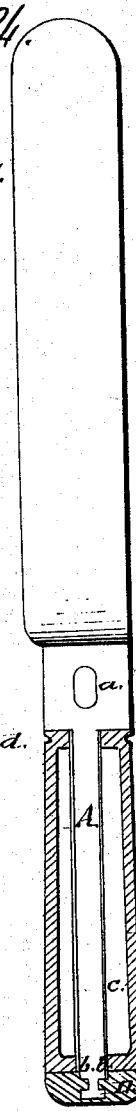
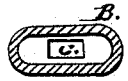

JAMES D. FRARY, OF NEW BRITAIN, CONNECTICUT.

Letters Patent No. 97,624, dated December 7, 1869.

IMPROVEMENT IN KNIFE-HANDLES.

The Schedule referred to in these Letters Patent and making part of the same

*To all whom it may concern:*

Be it known that I, JAMES D. FRARY, of New Britain, in the county of Hartford, and State of Connecticut, have invented a new and useful Improvement in Handles for Table-Cutlery; and I do hereby declare the following to be a full, clear, and exact description thereof, which will enable those skilled in the art to make and use the same, reference being had to the accompanying drawing, forming part of this specification, in which drawing—

Figure 1 represents a sectional side elevation of this invention.

Figure 2 is a transverse section of the same.

Figure 3 is a horizontal section of the same.

Similar letters indicate corresponding parts.

This invention consists in combining, with the tubular metal handle, a metal bolster and a metal cap, which are cast on the tang, after the latter has been introduced into the tubular handle, said tang being provided with a hole at its inner, and with notches at its outer end, in such a manner, that by the hole and notches, the bolster and the cap are firmly retained, and, by the bolster and cap, the tubular handle is secured to the tang, without requiring any rivets, or other fastenings.

In the drawing—

The letter A designates the tang of the table-knife, (or fork,) which is provided with a hole, *a*, near its inner wide end, and with notches *b* near its outer end, as shown in fig. 1 of the drawing.

B is a metallic handle, provided with a channel, *c*, extending throughout its entire length, and capable of receiving the tang A.

The cross-section of this handle is such as shown in fig. 3, and said handle is either plain, or it may be ornamented in various different ways.

Said tang is somewhat longer than the handle, and, when the handle is placed on the tang, it bears at its inner end against the shoulders *d*, (see fig. 1,) while the outer notched end of the tang projects beyond the handle.

The handle is retained in position on the tang by means of a bolster, C, and cap, D, which are made of nickel metal, or of metal which fuses at a comparatively low temperature, so that the same can be cast on the tang, without injuring the temper of the knife or fork.

A suitable mould is provided to receive the tang, with the handle, leaving room for the bolster and cap; and, by pouring the fused metal in this mould, the bolster and cap are formed, the bolster being firmly retained by the metal passing through the hole *a*, and the cap, by the metal entering the notches *b*, and, by the cap and bolster, the handle is held in position, and prevented from coming off from the tang.

By these means, a handle for table-cutlery is produced, which is not liable to shrink or swell, which can be made very cheap, which can be attached to the tang with little trouble or expense, in a very substantial manner, and which can be made sufficiently heavy to balance the knife-blade, thereby saving the necessity of loading the handle for that purpose, as is now commonly done.

Having thus described my invention,

What I claim as new, and desire to secure by Letters Patent, is—

A knife, consisting of the blade and tang A, the latter being provided with the hole *a* and recesses *b b*, and tubular cast-metal handle B, the tang and tubular handle being attached by casting, substantially as described.

The above specification signed by me, this 22d day of June, 1869.

JAMES D. FRARY.

Witnesses:
W. HAUFF,
C. WAHLERS.